(12) United States Patent
Wirbelauer

(10) Patent No.: US 12,695,276 B2
(45) Date of Patent: Jul. 28, 2026

(54) MOUNTING ARRANGEMENT FOR THE INTERNAL FITTING OF A SWITCH CABINET HOUSING

(71) Applicant: RITTAL GMBH & CO. KG, Herborn (DE)

(72) Inventor: Sascha Wirbelauer, Weilburg-Odersbach (DE)

(73) Assignee: RITTAL GMBH & CO. KG, Herborn (DE)

( * ) Notice: Subject to any disclaimer, the term of this patent is extended or adjusted under 35 U.S.C. 154(b) by 264 days.

(21) Appl. No.: 18/567,569

(22) PCT Filed: Apr. 25, 2022

(86) PCT No.: PCT/DE2022/100307
§ 371 (c)(1),
(2) Date: Dec. 6, 2023

(87) PCT Pub. No.: WO2022/262888
PCT Pub. Date: Dec. 22, 2022

(65) Prior Publication Data
US 2024/0283227 A1      Aug. 22, 2024

(30) Foreign Application Priority Data
Jun. 18, 2021    (DE) ..................... 10 2021 115 852.4

(51) Int. Cl.
*H02B 1/32*            (2006.01)
(52) U.S. Cl.
CPC ..................................... *H02B 1/32* (2013.01)

(58) Field of Classification Search
CPC .................................. H02B 1/32; H05K 7/183
See application file for complete search history.

(56) References Cited

U.S. PATENT DOCUMENTS 5,791,498 A * 8/1998 Mills ........................ H02B 1/34
211/183
6,052,274 A * 4/2000 Remsburg ............... F16B 43/00
411/386
(Continued)

FOREIGN PATENT DOCUMENTS

CH           285914 A      9/1952
CN       105864263 A      8/2016
(Continued)

OTHER PUBLICATIONS

International Search Report (English and German) and Written Opinion of the ISA (German) issued in PCT/ DE2022/100307, mailed Jul. 28, 2022; ISA/EP.
(Continued)

*Primary Examiner* — Robert J Hoffberg
(74) *Attorney, Agent, or Firm* — Harness, Dickey & Pierce, P.L.C.

(57) ABSTRACT

A mounting arrangement for the interior fit-out of a switch cabinet housing, having an interior fitting rail which is mounted in the interior of a switch cabinet housing along a housing wall of the switch cabinet housing and that has a first mounting plane which extends parallel at a distance from the housing wall, wherein the mounting arrangement has a fitting rail which is mounted on the interior fitting rail and has a second mounting plane which extends parallel at a distance from the first mounting plane.

12 Claims, 5 Drawing Sheets

(56)           References Cited

U.S. PATENT DOCUMENTS

| 6,155,434 | A | * | 12/2000 | Benner | .................... | H02B 1/32 |
| | | | | | | 211/26.2 |
| 6,238,028 | B1 | * | 5/2001 | Benner | .................... | H02B 1/34 |
| | | | | | | 312/265.3 |
| 10,201,107 | B2 | * | 2/2019 | Müller | .................... | H05K 7/14 |

FOREIGN PATENT DOCUMENTS

| DE | 3917985 | A1 | 12/1989 |
| DE | 41 08 140 | A1 | 10/1992 |
| DE | 195 30 016 | A1 | 2/1997 |
| DE | 196 47 802 | C1 | 1/1998 |
| DE | 196 47 727 | A1 | 5/1998 |
| DE | 10 2017 114 129 | A1 | 12/2018 |
| EP | 2783437 | B1 | 1/2016 |
| EP | 3175521 | B1 | 9/2019 |
| EP | 3758172 | A1 | 12/2020 |

OTHER PUBLICATIONS

"Schalt-und Steueranlagenbau leicht gemacht", www.elektro.net Aug. 31, 2011 (Aug. 31, 2011), Retrieved from the Internet: URL:https://www.elektro.net/file/show/81882/804862/DE_08_11_AT12.pdf, XP055944160, [retrieved on Jul. 19, 2022], 1-3,5,7-15, figures 8, 9.

* cited by examiner

MOUNTING ARRANGEMENT FOR THE INTERNAL FITTING OF A SWITCH CABINET HOUSING

CROSS-REFERENCE TO RELATED APPLICATIONS

This application is a U.S. National Phase Application under 35 U.S.C. 371 of International Application No. PCT/DE2022/100307, filed on Apr. 25, 2022, which claims the benefit of German Patent Application No. 10 2021 115 852.4, filed on Jun. 18, 2021. The entire disclosures of the above applications are incorporated herein by reference.

BACKGROUND

This section provides background information related to the present disclosure which is not necessarily prior art.

Technical Field

The invention is based on a mounting arrangement for the interior fit-out of a switch cabinet housing, in particular of a frameless switch cabinet housing, having an interior fitting rail which is mounted in the interior of a switch cabinet housing along a housing wall of the switch cabinet housing and that has a first mounting plane which extends parallel at a distance from the housing wall. Such a mounting arrangement is known from EP 3 175 521 B1.

Discussion

Such mounting arrangements serve in particular for the internal fitting-out of switch cabinet housings which do not have a frame with the aid of which a plurality of mounting planes for the internal fitting-out of the switch cabinet housing could be provided. Such frameless switch cabinet housings, frequently also referred to as compact housings, are generally produced from a single metal plate by edging and joining. The mounting planes in the case of frameless switch cabinet housings must therefore be provided with the aid of interior fitting rails which are anchored in the interior of the switch cabinet housing. For this purpose, the interior fitting rail can be clamped for example between opposite edges in the depth direction of the switch cabinet housing, for example between a rear wall and a front-side door frame of the housing. An interior fitting rail suitable for this purpose is known from EP 2 783 437 B1.

The known mounting arrangements and interior fitting rails have the disadvantage that they can provide only a limited number of mounting planes, in particular with regard to mounting planes which are arranged parallel to the housing wall, along which the interior fitting rail is mounted. These mounting planes which are guided parallel to the housing wall cannot be used, in particular, to mount fitting components, for example outlet filters, which are fastened directly to the housing wall or extend through the housing wall. This is already due to the fact that the mountability of the interior fitting rail on the front side of the switch cabinet housing is limited by the width of the door frame or the clear opening dimension of the switch cabinet housing.

SUMMARY

This section provides a general summary of the disclosure and is not a comprehensive disclosure of its full scope or all of its features.

It is therefore one aspect of the invention to further develop a mounting arrangement of the type described in the introduction in such a way that it provides at least one additional mounting plane parallel to the housing wall, along which the interior fitting rail is mounted. The mounting arrangement should preferably be suitable for providing at least one mounting plane which lies within the clear opening dimension of the switch cabinet housing.

Accordingly, in a mounting arrangement for the interior fit-out of a preferably frameless switch cabinet housing, it is provided that the mounting arrangement has at least one fitting rail which is mounted on the interior fitting rail and has a second mounting plane which extends parallel at a distance from the first mounting plane. It is therefore proposed to use the first mounting plane of the interior fitting rail to mount at least one fitting rail providing a further mounting plane. By mounting the fitting rail on the first plane of the interior fitting rail, preferably only part of the first mounting plane is occupied. The fitting-out of the frameless switch cabinet housing with fitting components is therefore possible further on the remaining first plane which is not occupied by the fitting rail. Both the first and the second mounting plane can therefore be used for the interior fit-out.

Since the interior fitting rail is mounted along the housing wall and its first mounting plane, which is oriented parallel to the housing wall, consequently extends parallel to the housing wall facing the interior of the switch cabinet housing, the mounting plane of the interior fitting rail can be used to mount thereon a fitting rail which, starting from the first mounting plane, extends further in the direction of the interior of the switch cabinet housing, in the direction perpendicular to the housing wall, in order to provide a second mounting plane at a distance parallel at a distance from the first mounting plane. Depending on the geometric design of the fitting rail, the second mounting plane can then even lie within the clear opening dimension of a door-side opening of the switch cabinet housing. If a plurality of fitting rails are mounted on the interior fitting rail, the second mounting planes thereof can lie arranged in the same plane or define different mounting planes at a distance from one another. Accordingly, the fitting rail can preferably have a length in the longitudinal direction of the interior fitting rail which is smaller than the length of the interior fitting rail.

The fitting rail can preferably be designed as an edged shaped sheet metal part, preferably as an open hollow profile. However, the fitting rail can also be designed as a solid component, for example as a shaped plastic part. The shaped sheet metal part can preferably have a plurality of 90° bends. The fitting rail or the shaped sheet metal part forming the fitting rails can be designed as a hollow profile open on one side. The hollow profile can be mounted with a first of its two longitudinal-side free ends on the mounting plane and can bear with a second end-side longitudinal edge outside the interior fitting rail on a housing wall, for example on the housing wall, along which the interior fitting rail is mounted. Thus, the fitting rail can for example engage around a free longitudinal edge of the interior fitting rail. For example, the fitting rail can be designed as an open hollow profile, which is mounted with a first of its two longitudinal edges on the first mounting side, extends around a free longitudinal edge of the interior fitting rail and can be supported with its second free longitudinal edge opposite the first longitudinal edge on the housing wall, along which the interior fitting rail is mounted. The fitting rail can additionally or alternatively be supported with a further profile side on a housing wall, which extends perpendicularly to the housing wall, along which the interior fitting rail is mounted. The two aforementioned housing walls can be housing walls of the switch cabinet housing that are at right angles to one another and merge into one another.

Optionally, it is possible to fasten the fitting rail to a bolt on the housing wall. For this purpose, a round hole can be provided on the longitudinal edge of the fitting rail facing the housing wall. This makes it possible to mount a nut from the inside of the housing.

Accordingly, the fitting rail can be mounted on the first mounting plane. The fitting rail can be a multi-edged shaped sheet metal part which extends from the first mounting plane to the second mounting plane and back again through the first mounting plane past a longitudinal edge of the interior fitting rail and preferably to the housing wall.

The fitting rail can be supported on the housing wall. The fitting rail can be connected to the interior fitting rail exclusively on the interior fitting rail, in particular exclusively in the first mounting plane of the interior fitting rail. The fitting rail can furthermore have no further direct non-positive connections to the interior fitting rail or the switch cabinet housing. However, it can also be provided that the fitting rail is fixed exclusively or additionally to the housing wall via a housing bolt.

The fitting rail can be supported on a further housing wall which extends perpendicularly to the first housing wall. For example, the housing wall, along which the interior fitting rail extends and along which the interior fitting rail is mounted within the switch cabinet housing, can be a vertical side wall of the switch cabinet housing. If the interior fitting rail is mounted on the side wall in the base region of the switch cabinet housing, the fitting rail can extend in the manner described above from the first mounting plane in the direction of the base of the switch cabinet housing and be supported there. Analogously, a support can be provided on the roof of the switch cabinet housing. Additionally or alternatively, the fitting rail can be supported on the vertical housing wall below the interior fitting rail, that is to say in a side wall section which extends between the base of the switch cabinet housing and the interior fitting rail. Additionally or alternatively, the fitting rail can be fixed to a housing bolt.

In particular if the fitting rail is designed as a hollow profile, it can have an end-side profile side which limits the opening of the hollow profile and via which the fitting rail is supported on the interior fitting rail, preferably on a side of the interior fitting rail which extends perpendicularly to the first mounting side of the interior fitting rail and merges into the first mounting side.

Accordingly, the first housing wall can for example be a vertical side wall of the switch cabinet housing and the further housing wall can be a horizontal bottom wall or a horizontal top wall of the switch cabinet housing.

The first mounting plane and the second mounting plane can have a distance from one another which corresponds to an integer multiple of a grid dimension of a system perforation of regularly spaced fastening passages through the first mounting plane and/or the second mounting plane. The first mounting plane and the second mounting plane preferably have the same system perforation and, particularly preferably, the fastening passages of the system perforations both of the first mounting plane and of the second mounting plane are arranged within the same multidimensional perforation grid of regularly spaced fastening passages, with the result that the grid distance is maintained over the mounting planes. The fitting rail can be connected, preferably screwed or latched, to the inner fitting rail via a system perforation of regularly spaced fastening passages through the first mounting plane.

The fitting rail can have a third mounting plane which extends perpendicularly to the first and the second mounting plane. The third mounting plane can preferably extend parallel to a narrow longitudinal side, having a system perforation, of the inner fitting rail. In particular, the fitting rail can have a profile side with the third mounting plane, which extends perpendicularly to the profile side, having the second mounting plane, of the fitting rail and is integrally formed thereon. The profile side, having the third mounting plane, of the fitting rail can merge continuously at its longitudinal edge facing the inner fitting rail into a fixing flange, via which the fitting rail is mounted on the inner fitting rail in the first mounting plane. In particular, the fixing flange can be bent over a 90° bend from the profile side, having the third mounting plane, of the fitting rail.

Accordingly, the third mounting plane can be formed by a connecting profile side which connects a profile side, having the second mounting plane, of the fitting rail to a fixing flange of the fitting rail, via which the fitting rail is mounted on the inner fitting rail in the first mounting plane.

A Z-shaped edge can extend from a profile side, having the second mounting plane, of the fitting rail in the direction of the housing wall and in the direction of the further housing wall extending perpendicularly to the housing wall. In this case, the fitting rail can be supported on the housing wall and/or on the further housing wall.

The fitting rail can be supported on the further housing wall via an end-side profile side of the Z-shaped edge, wherein the end-side profile side is preferably a profile side, facing away from the second mounting plane, of the fitting rail. The fitting rail can furthermore be supported on the interior fitting rail in the manner described above.

The end-side profile side of the Z-shaped edge can have at least one aperture, into which at least one friction lining is inserted. The end-side profile side can be supported on the further housing wall via the friction lining, in particular on a further housing wall of the switch cabinet housing, which extends perpendicularly to the housing wall, along which the interior fitting rail is mounted in the interior of the switch cabinet housing. As an alternative to the friction lining, at least one screw, for instance a cylinder head screw, can be screwed into a through-hole in the end-side profile side of the Z-shaped edge.

Optionally, the Z-shaped edge can have a central profile side, which has a fourth mounting plane between the first mounting plane and the second mounting plane, wherein the fourth mounting plane preferably has a system perforation of regularly spaced fastening passages through the fourth mounting plane. The fourth mounting plane can be aligned, in particular, parallel to the first and to the second mounting plane.

The mounting arrangement can furthermore have a fitting component mounted in or on the housing wall, for example an outlet filter, wherein the fitting component can have a structural dimension, with which it projects from the housing wall into the interior of the switch cabinet housing. The structural dimension can be greater than a first distance of the first mounting plane from the housing wall and smaller than a second distance of the second mounting plane from the housing wall. This embodiment makes it possible for an internal fitting component mounted in the second mounting plane, for example a mounting chassis, to be mounted over the fitting component, for example the outlet filter, without the fitting component colliding with the mounting chassis. Accordingly, the mounting chassis can be used to mount the fitting component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Further details of the invention are explained with reference to the figures below. In the figures.

DETAILED DESCRIPTION

Example embodiments will now be described more fully with reference to the accompanying drawings.

Figure 1:
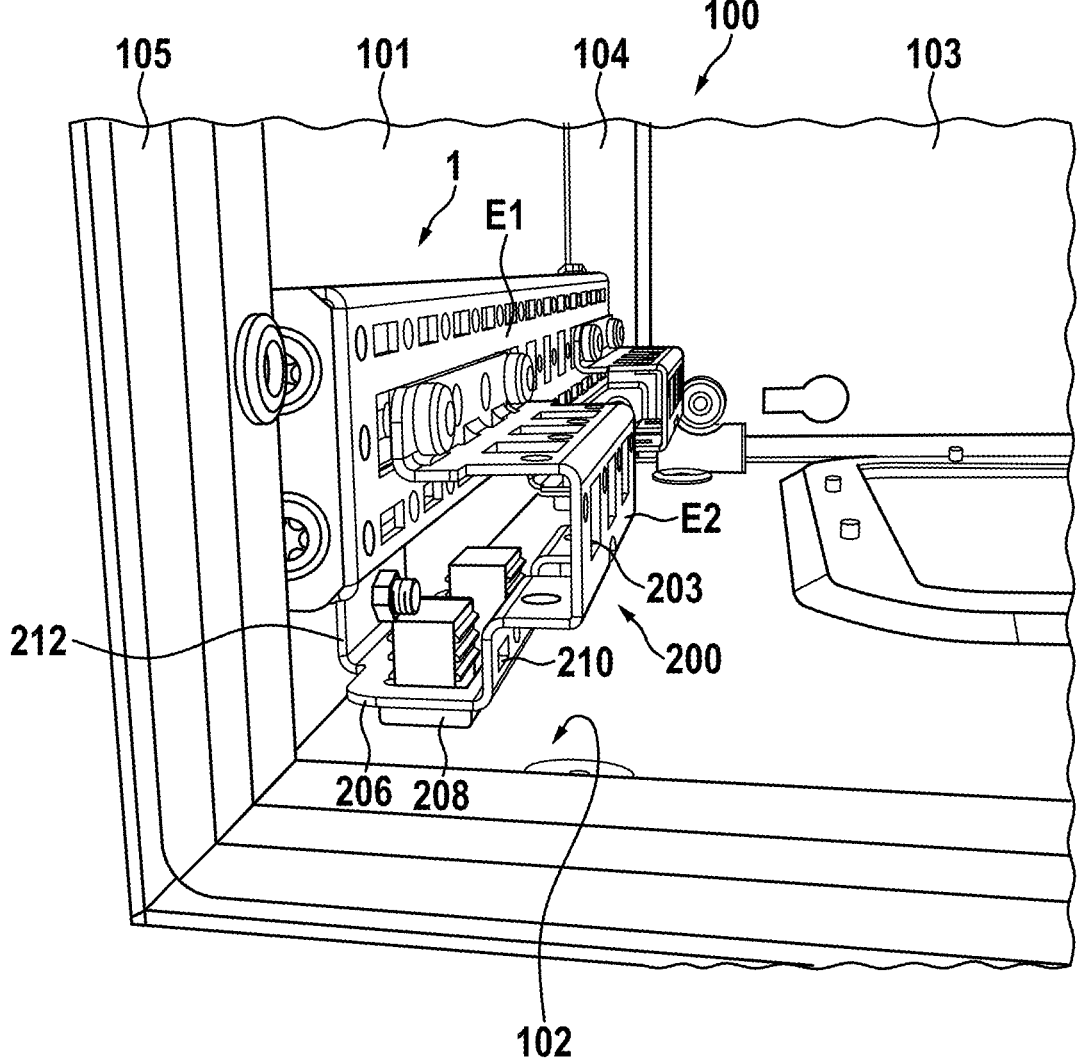
FIG. 1 shows a perspective view of a detailed view of a mounting arrangement according to the invention.
Figure 2:
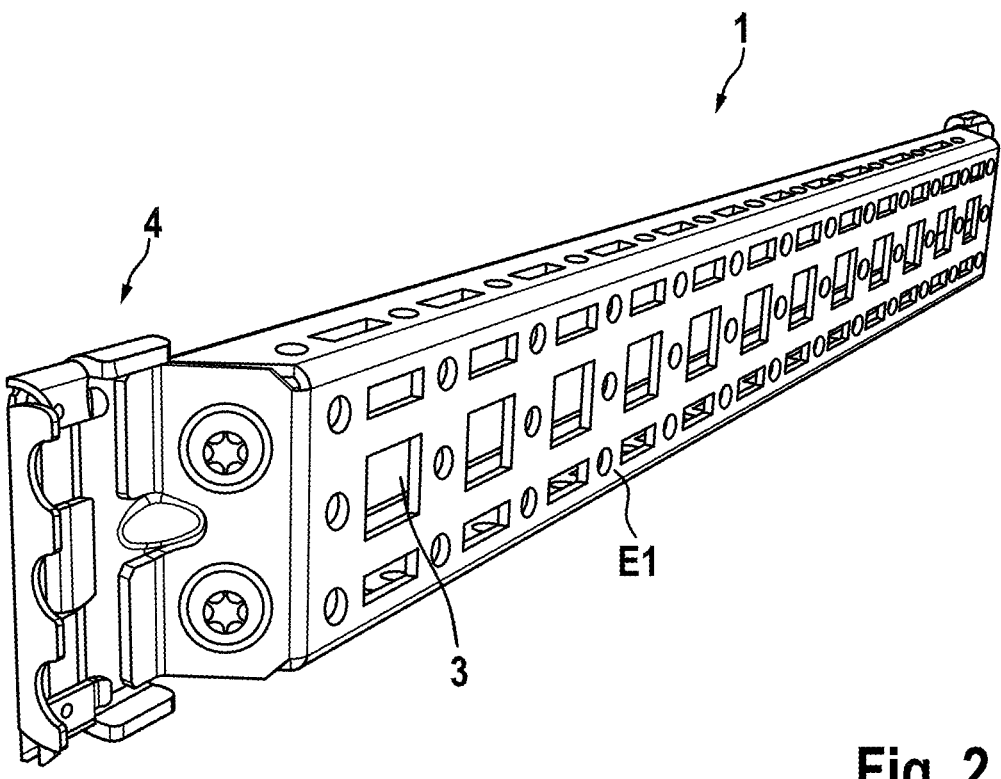
FIG. 2 shows a perspective view of the internal fitting rail of the mounting arrangement according to FIG. 1.
Figure 3:
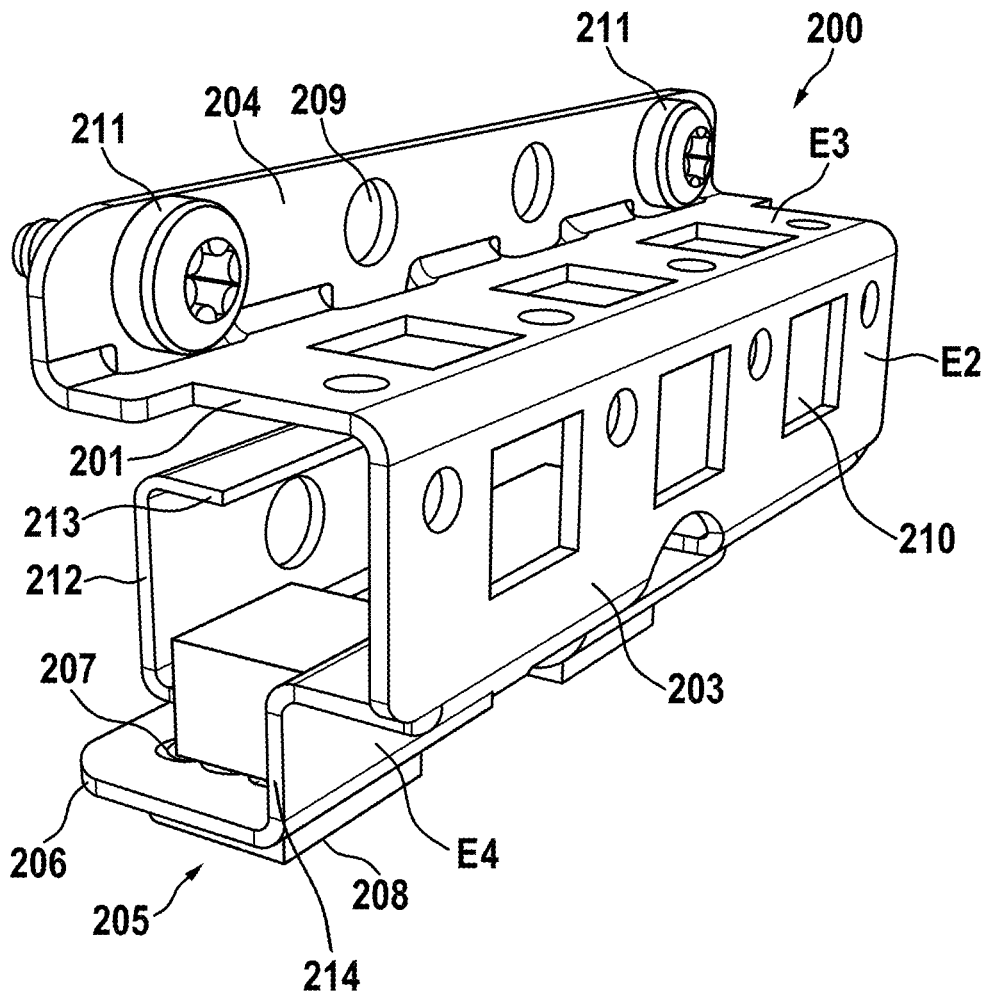
FIG. 3 shows a perspective view of the fitting component of the mounting arrangement according to FIG. 1.

FIGS. 1 to 3 show a first embodiment according to the invention of a mounting arrangement for the internal fitting of a switch cabinet housing 100. The mounting arrangement has an interior fitting rail 1 which extends in the depth direction of the switch cabinet housing 100 between opposite boundaries of a side wall 101 of the switch cabinet housing 100 and is in particular clamped there. For example, the interior fitting rail 1 can have a tensioning element 4 with a toggle lever at at least one of its opposite longitudinal ends, as is described in EP 2 783 437 B1. As an alternative to the toggle lever, clamping of the interior fitting rail can be achieved via a pure axial movement of the tensioning element 4, for instance by the tensioning element 4 being a sheet-metal part with a clamping side and a mounting side which enclose an obtuse angle, wherein the sheet-metal part is mounted on the first mounting plane E1 of the interior fitting rail 1 via a screw or the like.

In this way, it is possible to clamp the interior fitting rail 1 in the orientation shown in FIG. 1 in the interior of the switch cabinet housing 100, for example between the rear wall 104 and the front-side door frame 105, without great outlay. The first mounting plane E1 is provided on its outer side oriented toward the interior of the switch cabinet via the interior fitting rail 1.

In order to provide further mounting planes extending beyond the first mounting plane E1, in particular a further second mounting plane E2 extending parallel to the first mounting plane E1 and the side wall 101, a fitting rail 200 is provided according to the invention. This fitting rail 200 is designed in the present case as a multi-edged shaped sheet metal part which substantially has the geometry of a hollow profile open on one side. However, the fitting rail 200 can also be designed as a solid component, for example a shaped plastic part. On a first of its two end-side longitudinal edges, the fitting rail 200 has a fixing flange 204, via which the fitting rail 200 is connected to the interior fitting rail 1 in the mounting plane E1. For this purpose, the fitting rail 200 can be screwed to the inner fitting rail via a system perforation 3 in the mounting plane E1. For the orientation of the fitting rail with respect to the interior fitting rail 1, plug-in means can be provided on the fixing flange 204, which plug-in means engage in corresponding apertures 209 in the mounting plane E1 and thus orient passages for bolts 211 in the mounting flange 204 with respect to the apertures of the system perforation 3 of the first mounting plane and thus facilitate the screwing of the fitting rail 200 to the interior fitting rail 1. The fitting rail 200 is supported on the inner wall 101, along which the interior fitting rail 1 is mounted in the interior of the switch cabinet interior housing 100, by an end-side support flange 212 opposite the fixing flange 204. Optionally, a housing bolt (not shown), for example a weld-on bolt, can be provided on the inside of the housing wall 101, which extends through a bore through the support flange 212 and makes it possible to additionally lock the fitting rail 200 on the housing 100 with the aid of a nut.

The fitting rail 200 is further supported via an end-side profile side 206 of a Z-shaped edge 205, via which the fitting rail 200 is supported on the base 102 of the switch cabinet housing 100. The fitting rail 200 is accordingly only non-positively connected to the interior fitting rail 1 via the screw connections 211 and is otherwise only supported on the base side 102 and on the side wall 101 of the switch cabinet housing 100. Nevertheless, this ensures sufficient stability for the process-reliable internal fitting of the switch cabinet housing. The fitting rails 200 can be mounted in the depth direction of the switch cabinet housing 100 or in the longitudinal direction of the interior fitting rail 1 at any desired position, for example, as illustrated, at a distance from the rear wall 104, with the result that a mounting plate 103 provided on the rear side 104 of the switch cabinet housing 100 can be mounted without collision with the fitting rail 200. The end-side profile side 206 of the Z-shaped edge 205 has apertures 207, into which a friction lining 208 is inserted, via which a frictional connection is produced between the end-side profile side 206 or the fitting rail 200 and the switch cabinet housing 100, in the present embodiment in particular with the base side 102. Optionally, the Z-shaped edge 205 can have a central profile side 214, which has a fourth mounting plane E4 between the first mounting plane E1 and the second mounting plane E2, wherein the fourth mounting plane E4 preferably has a system perforation of regularly spaced fastening passages 210 through the fourth mounting plane E4. The fourth mounting plane E4 can be aligned, in particular, parallel to the first E1 and to the second E2 mounting plane.

While the interior fitting rail 1 shown in FIG. 2 substantially has the properties as are described in EP 3 175 521 B1 and in EP 2 783 437 B1 and in particular has a tensioning element 4 at at least one of its two opposite ends, which tensioning element is suitable for clamping the interior fitting rail 1 between opposite sides of the switch cabinet housing 100, the fitting rail 200 according to FIG. 3 can be designed substantially as a shaped sheet metal part. The shaped sheet metal part can be produced by punching and edging. It can be formed, in particular, from a plurality of 90° bends of a sheet metal plate which form the geometry shown in FIG. 3.

Starting from a fixing flange 204 for fixing the fitting rail 200 to the mounting side E1 of an interior fitting rail 1, the fitting rail 200 can have a connecting profile side 201 which connects the fixing flange 204 orthogonally to a further profile side 203 which has the second mounting plane E2. The further profile side 203 includes system perforations 210. According to the invention, the second mounting plane E2 is guided parallel to the first mounting plane E1 and to the housing wall 101, along which the interior fitting rail 1 is mounted. In particular, the second mounting plane E2 has a greater distance from the housing wall 101 in comparison with the first mounting plane E1 of the interior fitting rail 1. At the longitudinal edge facing away from the connecting profile side 201, the further profile side 203 merges into a Z-shaped edge 205, with which the fitting rail 200 extends from the further profile side 203 with the second mounting plane E2 in the direction of the housing wall 101 and a further housing wall 102, perpendicular thereto, of the switch cabinet housing 100. In the manner already described above, an end-side profile side 206 of the Z-shaped edge 205 and a profile side 212 which is integrally formed thereon and extends perpendicularly thereto and which forms a support flange 212 can serve to support the fitting rail 200 in a corner region in which the housing wall 101 merges into a further housing wall 102, for example a side wall merges into a bottom wall.

The fitting rail 200 is designed as a hollow profile and has an end-side profile side 213 which limits the opening of the hollow profile and via which the fitting rail 200 is supported on the interior fitting rail 1, specifically on a side of the interior fitting rail 1 which extends perpendicularly to the first mounting side E1 of the interior fitting rail 1 and merges into the first mounting side E1, as can be seen somewhat from the combined view of FIGS. 1 and 3.

Figure 4:
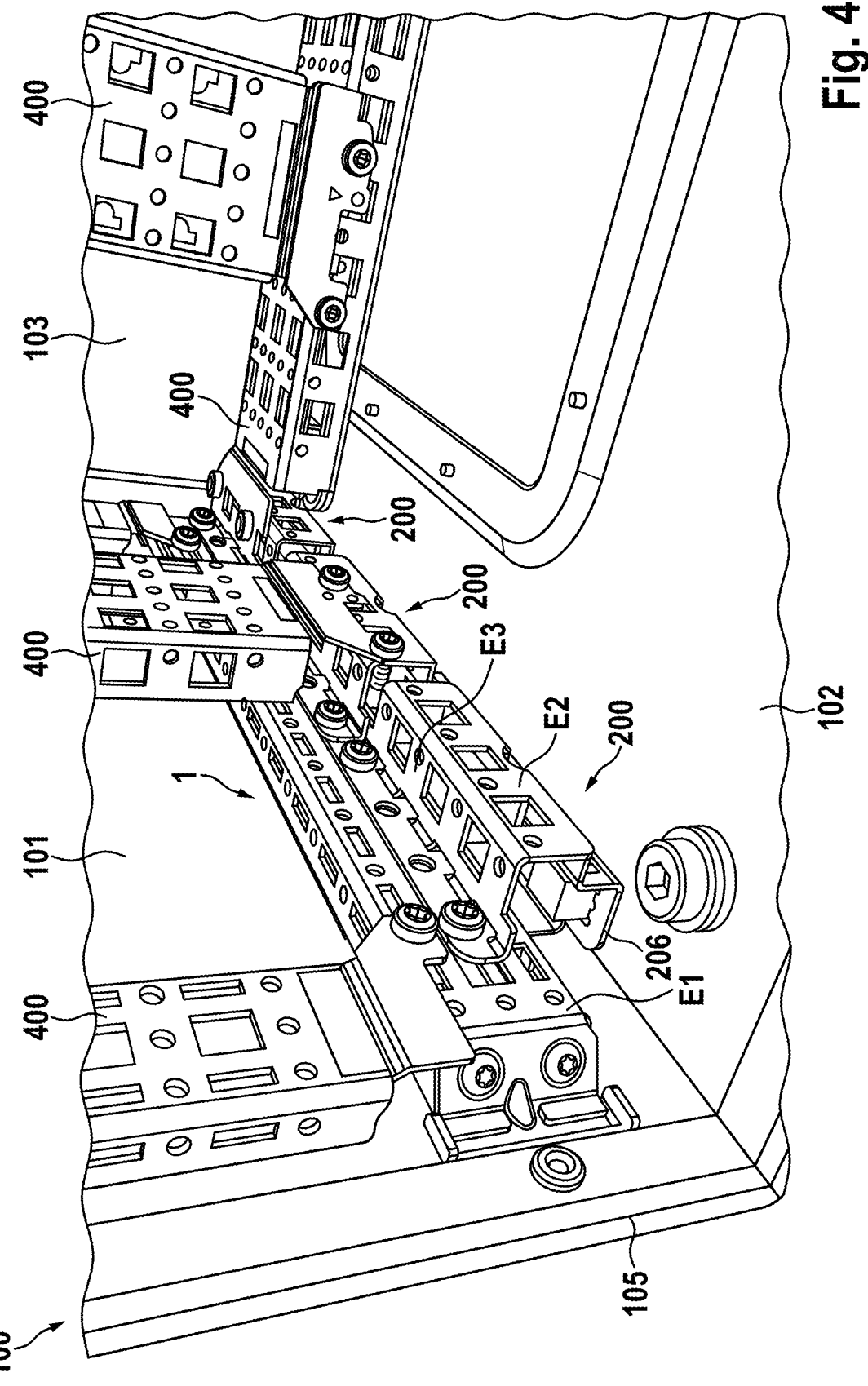
FIG. 4 shows a perspective view of a detailed view of a further mounting arrangement according to the invention.
Figure 5:
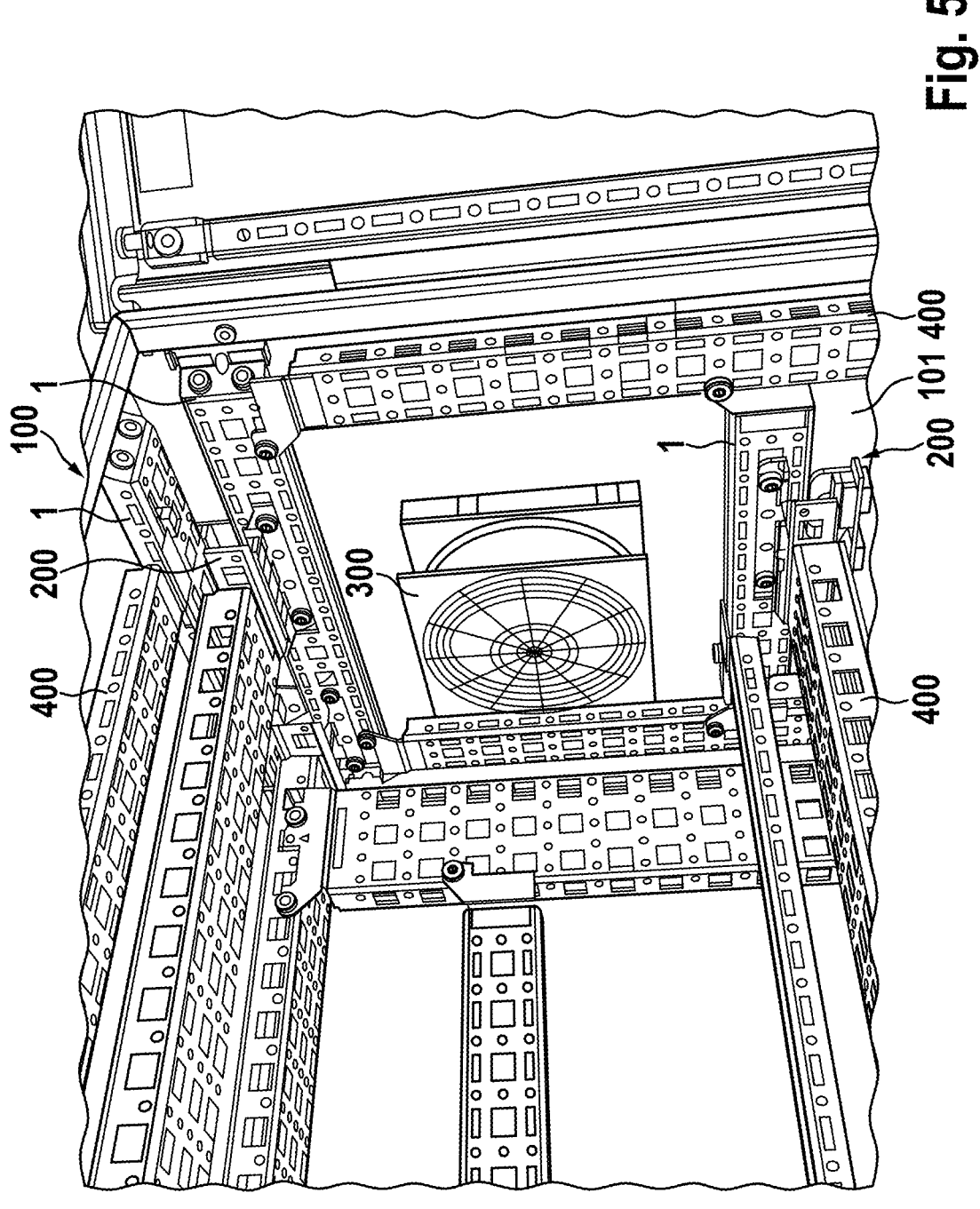
FIG. 5 shows a perspective view of a detailed view of yet a further mounting arrangement according to the invention.

FIGS. 4 and 5 show further embodiments of mounting arrangements according to the invention, which illustrate that the second mounting planes E2 and the first mounting planes E1 can be used to mount internal fitting components 400, for example mounting chassis 400, parallel to a housing wall 101, here a side wall in the embodiment according to FIG. 4, wherein the mounting chassis 400, which are mounted in the second mounting plane E2, have a greater distance with their associated mounting plane with respect to the inside of the side wall 101. This can be used, for example, to mount a fitting component 300 mounted on or in the side wall 101, for example an outlet filter, without there being any risk of a collision between the chassis and the outlet filter.

The connecting profile side 201 (cf. FIG. 3) with the third mounting plane E3 can be used to mount a mounting chassis 400 and the like in a plane perpendicular to the side wall 101 and to the first and second mounting planes E1, E2. Such a mounting chassis 400 can extend in particular in the horizontal direction, that is to say in the width direction of the switch cabinet housing, for example between opposite side walls of the switch cabinet housing 100.

As can be seen in FIG. 5, the interior fitting component 400 is not necessarily in the form of a mounting element clamped between opposite side walls, but can itself also be in the form of a mounting chassis which is otherwise mounted in the interior of the switch cabinet housing 100 along a housing wall 101 and which has the first mounting plane E1 which extends parallel at a distance from the housing wall 101. In addition, the fitting rail 200 does not necessarily have to be arranged in the corner region in the transition from a side wall 101 to a bottom wall 102 in the manner shown in FIG. 1 and can stand with the end-side profile side 206 of the Z-shaped edge 205 on a bottom side 102 or bear against a roof side. Owing to the support of the fitting rail 200 via the support flange 212 on the housing wall 101, even in the absence of support of the end-side profile side 206, sufficient stability is provided to provide further fastening possibilities for the internal fitting of the switch cabinet housing 100 via the second mounting plane E2 or the third mounting plane E3.

The features of the invention disclosed in the above description, in the drawings and in the claims can be essential both individually and in any desired combination for the realization of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switch cabinet housing comprising a mounting arrangement for an interior fit-out of the switch cabinet housing, the mounting arrangement having:

a first interior fitting rail which is mounted in an interior of the switch cabinet housing along a housing wall of the switch cabinet housing and that has a first mounting plane which extends parallel at a distance from the housing wall, and a second fitting rail which is mounted on the interior fitting rail and has a second mounting plane which extends parallel at a distance from the first mounting plane, wherein the second fitting rail is supported on a further housing wall which extends perpendicularly to the first housing wall, and wherein the second fitting rail is a multi-edged shaped sheet metal part which extends from the first mounting plane to the second mounting plane and back again through the first mounting plane past a longitudinal edge of the first interior fitting rail.

2. The switch cabinet housing according to claim 1, in which the second fitting rail is mounted on the first mounting plane.

3. The switch cabinet housing according to claim 1, in which either a. the first housing wall is a vertical side wall of the switch cabinet housing and the further housing wall is a horizontal bottom wall or a horizontal top wall of the switch cabinet housing, or b. the first housing wall is the horizontal bottom wall, or the horizontal top wall of the switch cabinet housing and the further housing wall is the vertical side wall of the switch cabinet housing.

4. The switch cabinet housing according to claim 1, in which the first mounting plane and the second mounting plane have a distance from one another which corresponds to an integer multiple of a grid dimension of a system perforation of regularly spaced fastening passages through the first mounting plane and/or the second mounting plane.

5. The switch cabinet housing according to claim 1, in which the second fitting rail is connected, to the first interior fitting rail via a system perforation of regularly spaced fastening passages through the first mounting plane.

6. The switch cabinet housing according to claim 1, in which the second fitting rail has a third mounting plane which extends perpendicularly to the first and the second mounting planes, wherein the third mounting plane extends parallel to a narrow longitudinal side, having a system perforation, of the first interior fitting rail.

7. The switch cabinet housing according to claim 6, in which the third mounting plane is formed by a connecting profile side which connects a further profile side, having the second mounting plane, of the second fitting rail to a fastening flange of the second fitting rail via which the second fitting rail is mounted on the first interior fitting rail in the first mounting plane.

8. The switch cabinet housing according to claim 6, in which a Z-shaped edge extends from a further profile side, having the second mounting plane, of the second fitting rail in a direction of the housing wall and in a direction of the further housing wall extending perpendicularly to the housing wall, wherein the second fitting rail is supported on the housing wall and the further housing wall.

9. The switch cabinet housing according to claim 8, in which the second fitting rail is supported on the further housing wall via an end-side profile side of the Z-shaped edge.

10. The switch cabinet housing according to claim 9, in which the end-side profile side has at least one aperture, into which at least one friction lining is inserted or a cylinder head screw is screwed, via which the end-side profile side is supported on the further housing wall.

11. The switch cabinet housing according to claim 8, in which the Z-shaped edge has a central profile side, which has a fourth mounting plane between the first mounting plane and the second mounting plane, wherein the fourth mounting plane has a system perforation of regularly spaced fastening passages through the fourth mounting plane.

12. The switch cabinet housing according to claim 1, which furthermore has a fitting component mounted in or on the housing wall, wherein the fitting component has a structural dimension, with which the fitting component projects from the housing wall into the interior of the switch cabinet housing, which is greater than a first distance of the first mounting plane from the housing wall and smaller than a second distance of the second mounting plane from the housing wall.

* * * * *